Patented Oct. 7, 1952

2,613,230

UNITED STATES PATENT OFFICE 2,613,230

PROCESS OF LIMITING POLYMERIZATION

Joseph B. Niederl, Brooklyn, N. Y., assignor to J. B. Niederl & Associates, Inc., New York, N. Y., a corporation of New York No Drawing. Application July 8, 1948, Serial No. 37,520

6 Claims. (Cl. 260—613)

The present invention is a continuation-in-part of my Patent No. 2,440,909 issued May 4, 1948, on application Serial No. 560,900, filed October 28, 1944, and my co-pending application No. 780,107 filed October 15, 1947, now abandoned, and several articles in the Journal of the American Chemical Society, vol. 63, p. 1731 (1941); vol. 65, p.629 (1943) and vol. 67, p. 1176 (1945).

Generally, the above cited references as well as the present invention deal with limiting and controlling direct and indirect phenol-aldehyde condensations by means of "blocked" phenols.

In the above cited patent, patent application and publications the amount of "blocked," or in only one ring position reactive, phenol used, was never less than equimolar quantities, or even double molar quantities, in comparison to the "unblocked" phenol subjected to condensation. An "unblocked" phenol, is one having either two, or three ring positions available for reaction.

In the present invention, the amount of "blocked" phenol used, is less than equimolar quantities, the amounts varying from 0.1 to 0.9 mol for each full mol of the "unblocked" phenol employed.

The principal purpose of using less than equimolar quantities of blocked phenol in mixed phenol-formaldehyde condensations, is to create condensation products of "planned" molecular weight. The "unblocked" phenol used in the present invention is the p-tt-octylphenol first described by me in my Patent No. 2,008,032 (1935) and in Industrial and Engineering Chemistry, vol. 30, p. 1269 (1938). Condensing this phenol with formaldehyde and a "blocked" phenol, preferably p-tt-octyl-o-cresol, in acid medium, mixtures of polynuclear linear phenolic condensation products form, possessing a structure as indicated below;

$$\underset{(CH_3)_2CCH_2C(CH_3)_3}{\overset{OH}{\underset{CH_3}{\bigcirc}}\!\!\!-CH_2-} \left[ \underset{(CH_3)_2CCH_2C(CH_3)_3}{\overset{OH}{\underset{}{\bigcirc}}\!\!\!-CH_2-} \right]_n \underset{(CH_3)_2CCH_2C(CH_3)_3}{\overset{OH}{\underset{}{\bigcirc}}\!\!\!-CH_3}$$

In alkaline medium, and using the same reactants, the structures of the poly-nuclear, linear condensation products formed, might be presented as follows:

$$\underset{(CH_3)_2CCH_2C(CH_3)_3}{\overset{OH}{\underset{CH_3}{\bigcirc}}\!\!\!-CH_2O-} \left[ -CH_2\underset{(CH_3)_2CCH_2C(CH_3)_3}{\overset{OH}{\underset{}{\bigcirc}}\!\!\!CH_2O-} \right]_n -CH_2\underset{(CH_3)_2CCH_2C(CH_3)_3}{\overset{OH}{\underset{}{\bigcirc}}\!\!\!CH_3}$$

Utilizing blocked phenols, as is the main objective and purpose of the instant invention, the "$n$" in the above formulas is approximately inversely proportional to the amount of "blocked" phenol used. The smaller the amount of the "blocked" phenol, the higher the average molecular weight of the final condensation products mixture. Since a number of physical properties and characteristics, such as melting point, fusion point, fluidity, viscosity, plasticity and oil solubility are to a large measure functions of the molecular weight in these types of polymers, it is an achievement and discovery, not heretofore realized, that by judicious use of a "blocked" phenol in these reactions, the creation of condensation products with predictable and predetermined properties is possible.

Besides the "blocked" phenol mentioned above, any other 2,4- or 2,6- dialkyl-phenol might be used. Such phenols are; the p-t-butyl-and p-t-amyl-o-cresols; or the 2,4-di-t-butyl- the 2,4- di-t-amyl- and the 2,4- or the 2,6-dimethyl-phenols.

Example 1.—Condensation in acid medium

Nine hundredths of a mol of p-tt-octylphenol (18.5 grams) and one hundredth of a mol of p-tt-octyl-o-cresol (2.2 grams) are mixed with 8.5 grams of a 35.3% aqueous formaldehyde solution (0.1 mol). One cc. of concentrated hydrochloric acid is then added and the mixture well stirred. The reaction is allowed to continue for 48 hours at room temperature. After this time, the reaction mixture is heated or subjected to steam distillation to remove volatile material. The non-volatile residue after washings with distilled water is separated and then allowed to dry in air.

The condensation product is a yellowish-brown solid which can be ground into a white powder. It has a lower fusion point than the condensation product obtained under the same reaction conditions but with the p-tt-octylphenol alone. Also its solubility, in both boiling and cold benzene, is higher than that of the condensation product with the unblocked phenol alone.

*Example 2.—Condensation in alkaline medium*

Seven hundredths of a mol of p-tt-octylphenol (14.4 grams) and three hundredths of a mol of p-tt-octyl-o-cresol (6.6 grams) are first melted together and then well mixed. To this mixture is added 8.5 grams of a 35.3% aqueous formaldehyde solution (0.1 mol) and 0.5 cc. of a 30% aqueous sodium hydroxide solution. The mixture is then well stirred or well shaken. After this, a reflux condenser is attached to the reaction flask and the mixture heated on an oil bath at 125° C. for two hours. After this time the condenser is changed and while heating at the same temperature for another hour, the volatile materials present in the reaction mixture are thus distilled off.

The condensation product mixture in this case is a semi-solid, with increased solubilities in both, boiling and cold benzene. On the other hand, the condensation product obtained when p-tt-octylphenol is condensed alone, following the above procedure, is a brown amorphous solid, with decreased solubilities in hot and cold benzene.

What I claim is:

1. A process which consists essentially in forming a mixture of and condensing p-tt-octylphenol with formaldehyde in the presence of less than equimolar quantities of a 2,4-di-alkyl-phenol in the absence of unalkylated phenol, the ratio of formaldehyde to alkylated phenols being equimolecular, and in the presence of a catalyst selected from the group of substances consisting of acids and alkalies.

2. A process which consists essentially in forming a mixture of and condensing p-tt-octylphenol with formaldehyde in the presence of less than equimolar quantities of 2-methyl-4-tt-octylphenol in the absence of unalkylated phenol, the ratio of formaldehyde to alkylated phenols being equimolecular, and in the presence of a catalyst selected from the group of substances consisting of acids and alkalies.

3. Poly-nuclear linear phenolic condensation products having the following structural formula:

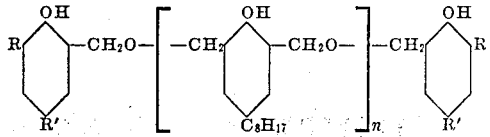

wherein R and R' are alkyl groups, said product being composed of blocked and unblocked phenols in the ratio 0.1 to 0.9 mol. of unblocked to 1 mol. of blocked phenol, and $n$ is approximately inversely proportional to the amount of blocked phenol.

4. Products according to claim 3 in which at least one of R is a methyl group.

5. Products according to claim 3 in which at least one of R' is a p-tt-octyl group.

6. Products according to claim 3 in which R is methyl and R' is p-tt-octyl.

JOSEPH B. NIEDERL.

REFERENCES CITED

The following references are of record in the file of this patent:

UNITED STATES PATENTS

| Number | Name | Date |
|---|---|---|
| 1,800,296 | Honel | Aug. 14, 1931 |
| 2,033,091 | Bruson | Mar. 3, 1936 |
| 2,049,447 | Honel | Aug. 4, 1936 |
| 2,139,081 | Honel | Dec. 6, 1938 |

OTHER REFERENCES

Granger "Condensation of phenols with formaldehyde." Ind. Eng. Chem., vol. 24, Nov. 4, pp. 442–48 (April 1932) (7 pp.).